(12) United States Patent
Oh et al.

(10) Patent No.: US 8,774,033 B2
(45) Date of Patent: Jul. 8, 2014

(54) APPARATUS AND METHOD FOR TRANSMITTING FRAME IN VEHICLE COMMUNICATION SYSTEM BASED ON WIRELESS ACCESS FOR VEHICULAR ENVIRONMENT

(75) Inventors: Cheon In Oh, Daejeon (KR); Kyeong-Soo Han, Daejeon (KR); Hyun Seo Oh, Daejeon (KR); Hyun Kyun Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 229 days.

(21) Appl. No.: 13/247,079

(22) Filed: Sep. 28, 2011

(65) Prior Publication Data

US 2012/0127874 A1 May 24, 2012

(30) Foreign Application Priority Data

Nov. 22, 2010 (KR) ........................ 10-2010-0116474

(51) Int. Cl.
*G01R 31/08* (2006.01)
(52) U.S. Cl.
USPC .......................................................... 370/252
(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | |
|---|---|---|---|
| 8,085,723 B2 | 12/2011 | Jeon et al. | |
| 2008/0069040 A1 | 3/2008 | An | |
| 2008/0232309 A1* | 9/2008 | McNew et al. | 370/329 |
| 2008/0232433 A1* | 9/2008 | McNew et al. | 375/140 |
| 2011/0128849 A1* | 6/2011 | Guo | 370/235 |
| 2012/0057556 A1 | 3/2012 | Jeon et al. | |
| 2012/0071191 A1* | 3/2012 | Tijink | 455/517 |
| 2012/0113262 A1* | 5/2012 | Hanisch et al. | 348/149 |
| 2012/0115417 A1* | 5/2012 | Moring et al. | 455/41.2 |
| 2012/0300929 A1* | 11/2012 | Schrodl et al. | 380/255 |

FOREIGN PATENT DOCUMENTS

| KR | 10-2008-0026461 | 3/2008 |
|---|---|---|
| KR | 10-0914707 | 8/2009 |

OTHER PUBLICATIONS

IEEE Trial-Use Standard for Wireless Access in Vehicular Environments (WAVE)—Multi-channel Operation, IEEE Vehicular Technology Society, IEEE Std 1609.4-2006, Nov. 29, 2006.
IEEE 802.11, Part 11: Wireless LAN Medium Access Control (MAC) and Physical Layer (PHY) Specifications Amendment 7: Wireless Access in vehicular environments, IEEE P802pTM/D9.0, Sep. 2009.

* cited by examiner

*Primary Examiner* — Jung-Jen Liu
(74) *Attorney, Agent, or Firm* — Staas & Halsey LLP

(57) ABSTRACT

In a vehicle communication system, a frame transmitting apparatus gives a transmission opportunity to an emergency frame received from an upper layer without EDCA (Enhanced Distributed Channel Access), and gives a transmission opportunity to a generic frame received from an upper layer through EDCA.

15 Claims, 6 Drawing Sheets

APPARATUS AND METHOD FOR TRANSMITTING FRAME IN VEHICLE COMMUNICATION SYSTEM BASED ON WIRELESS ACCESS FOR VEHICULAR ENVIRONMENT

CROSS-REFERENCE TO RELATED APPLICATION

This application claims priority to and the benefit of Korean Patent Application No. 10-2010-0116474 filed in the Korean Intellectual Property Office on Nov. 22, 2010, the entire contents of which are incorporated herein by reference.

BACKGROUND OF THE INVENTION (a) Field of the Invention

The present invention relates to an apparatus and method for transmitting a frame in a WAVE-based vehicle communication system.

(b) Description of the Related Art

WAVE (Wireless Access for Vehicular Environment) is a network for vehicle communication with interference such as a Doppler shift caused by high-speed travel, and supports vehicle-to-vehicle (V2V) communication and vehicle to infrastructure (V2I) communication installed between a vehicle and a road.

The WAVE uses 7 channels, i.e., multi-channels allocated for V2V and V2I in a frequency spectrum of 5.85 to 5.925 GHz (bandwidth of 75 MHz). One of the 7 multi-channels is a control channel CCH used for transmitting and receiving control information, and the other 6 channels are service channels SCHs used for traffic safety or general commercial services. At this time, if one physical layer PHY is used, communication can only be done using one channel. Accordingly, in the case of using one physical layer PHY, the multi-channels can be operated, divided into a CCH interval for using the CCHs and a SCH interval for using the SCH. Various control frames are transmitted and received between a vehicle and an infrastructure during the CCH interval, and service frames are transmitted and received between an infrastructure and a vehicle and between vehicles during the SCH interval.

A vehicle communication network supports QoS (Quality of Service) using a contention-based EDCA (Enhanced Distributed Channel Access) scheme. EDCA provides channel access priority according to user priority.

WAVE uses four queues of different priorities for CCH and SCH, respectively, to achieve contention-based EDCA transmission, and frames are transmitted with high channel access probability. By the way, in the event of any emergency frame that should be urgently transmitted in real time, such as an accident message or an urgent message, even if an emergency frame is allocated to a queue with high priority, a transmission delay occurs to the emergency frame if other frames are saved in the queue.

Moreover, even when there is no frame in the queue, transmission is possible only during a corresponding channel interval, and consequently a transmission delay occurs until a channel interval capable of transmission arrives. For example, in the case of an emergency frame which requires the use of a CCH channel, if the current channel interval is an SCH interval, a transmission delay of the emergency frame occurs until a CCH interval arrives.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for transmitting a frame in a WAVE-based vehicle communication system, which can reduce the transmission delay of an emergency frame that should be urgently transmitted.

An exemplary embodiment of the present invention provides an apparatus for transmitting a frame using one physical layer in a vehicle communication system. The frame transmitting apparatus includes: a control channel processor; a service channel processor; an emergency processor; a channel router; a channel output unit; and a non-priority scheduler. The control channel processor processes and outputs a generic frame using a control channel. The service channel processor processes and outputs a generic frame using a service channel. The emergency processor processes and outputs an emergency frame. The channel router identifies the type of a frame received from an upper layer, and passes the received frame to one of the control channel processor, the service channel processor, and the emergency processor. The channel output unit selects and outputs one of the frames output from the control channel processor and the service channel processor. The non-priority scheduler selects either the emergency frame output from the emergency processor or the generic frame output from the channel output unit, and gives a transmission opportunity to the selected frame.

Another embodiment of the present invention provides a method for transmitting a frame using one physical layer in a vehicle communication system. The frame transmission method includes: receiving a frame from an upper layer; identifying the type of the frame; checking the state of a channel; and, when the channel is idle, transmitting an emergency frame requiring urgent transmission preferentially over a generic frame.

Still another embodiment of the present invention provides a method for transmitting a frame using one physical layer in a vehicle communication system. The frame transmission method includes: receiving a frame from an upper layer; if the frame is an emergency frame to be urgently transmitted, storing the frame in a first transmission queue; if the frame is a generic frame, storing the frame in one of a plurality of second transmission queues used for a control channel and a plurality of third transmission queues used for a service channel; allowing at least one of the plurality of second transmission queues and the plurality of third transmission queues to participate in internal contention for each channel interval; and giving priority of transmission opportunity to the emergency frame output from the first transmission queue over the generic frame of the transmission queue that has won the internal contention.

DETAILED DESCRIPTION OF THE EMBODIMENTS

Figure 1:
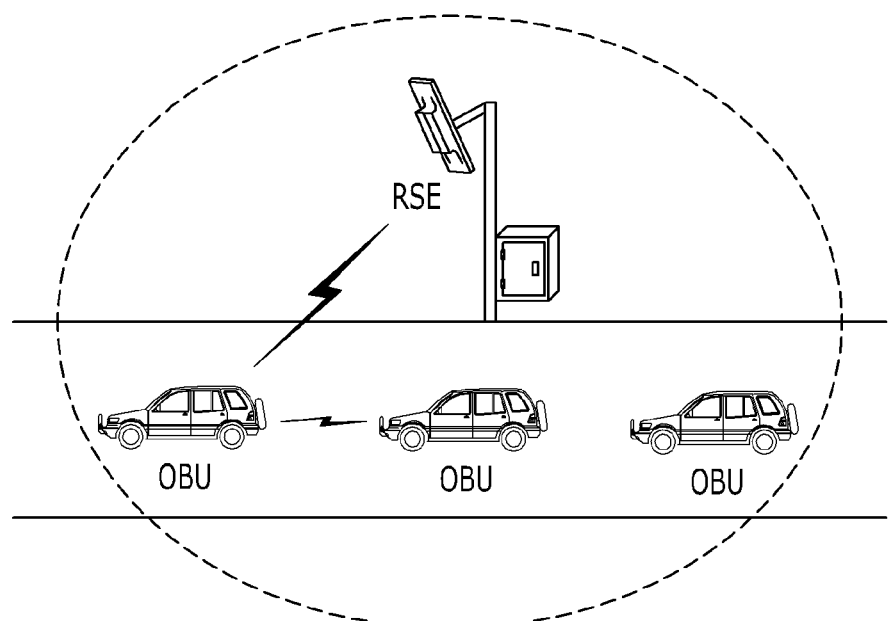
FIG. 1 is a view showing a communication network to which the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Now, an apparatus and method for transmitting a frame in a WAVE-based vehicle communication system will be described.

FIG. 1 is a view showing a communication network to which the present invention is applied.

Referring to FIG. 1, a communication network applied to the present invention comprises road side equipment RSE of an infrastructure installed on a road and an on-board unit OBU mounted in a vehicle.

By such a communication network, a vehicle-to-infrastructure (V2I) communication network between road side equipment RSE and an on-board unit OBU and a vehicle-to-vehicle (V2V) communication network between on-board units OBUs are established, whereby the road side equipment RSE performs communication with on-board units OBUs located within its communication radius, and communication can be performed between the on-board units OBUS as well.

V2V provides a vehicle collision warning service, group communication, etc. based on communication between on-board units OBUs, and V2I provides vehicles with traffic information, safety support and download services, etc. based on communication between road side equipment RSE and an on-board unit OBU.

Such road side equipment RSE and such an on-board unit OBU perform V2v and V2I communications by multi-channels operated in one physical layer PHY.

Figure 2:
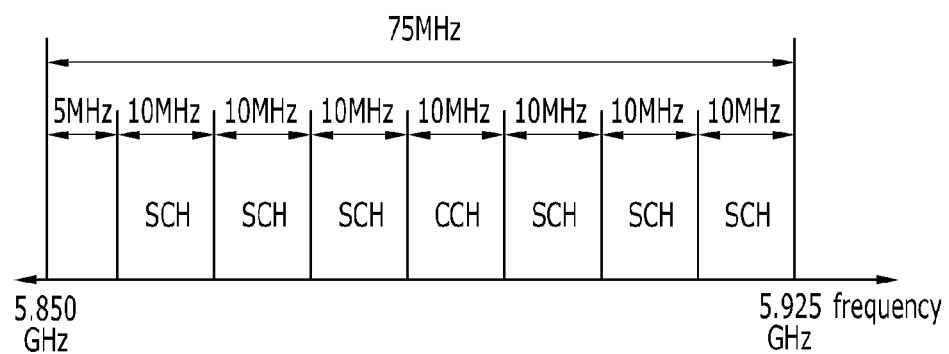
FIG. 2 is a view showing multi-channels from a frequency perspective according to an exemplary embodiment of the present invention.

FIG. 2 is a view showing multi-channels from a frequency perspective according to an exemplary embodiment of the present invention.

As shown in FIG. 2, road side equipment RSE and an on-board unit OBU can communicate via 7 channels in a frequency spectrum of 5.85 to 5.925 GHz (bandwidth of 75 MHz). One of the 7 multi-channels is a control channel CCH dedicated for traffic safety, and the other 6 channels are service channels SCHs used for traffic safety or general commercial services. IP (Internet Protocol) frames and WSM (WAVE Short Message) frames can be transmitted through the SCHs, and management frames and WSM frames can be transmitted through the CCH. Also, an emergency data frame requiring priority transmission can be transmitted through the CCH or the SCH.

In a physical layer, communication is performed using one channel at a time. Thus, in one physical layer, road side equipment RSE and an on-board unit OBU perform communication alternately through the CCH and the SCHs, each of which is divided into time slots.

Figure 3:
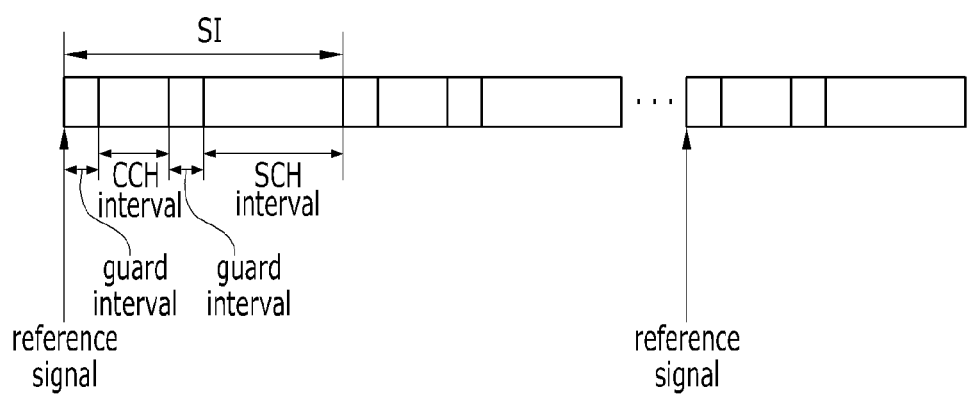
FIG. 3 is a view showing a multi-channel operation scheme using one physical layer which is performed by road side equipment and an on-board unit according to an exemplary embodiment of the present invention.

FIG. 3 is a view showing a multi-channel operation scheme using one physical layer which is performed by road side equipment and an on-board unit according to an exemplary embodiment of the present invention.

Referring to FIG. 3, the road side equipment RSE and the on-board unit OBU define a synchronization interval SI with respect to a reference signal in order to operate multi-channels in one physical layer. The synchronization interval SI comprises a CCH interval for using the CCH, a SCH interval for using the SCHs, and a guard interval positioned between the CCH interval and the SCH interval by taking into account synchronization and operation time required for frequency change. At this point, the reference signal may be a signal generated using a Universal Timing Clock (UTC) time signal, i.e., a GPS signal.

Frame transmission is not performed in the guard interval, and frame transmission is performed in the CCH interval and the SCH interval through the corresponding channels. In the CCH interval, a control frame, such as (Wave Short Message Protocol) WSMP, can be transmitted and received between the road side equipment RSE and the on-board unit OBU, whereas, in the SCH interval, an IP frame and a control frame can be transmitted and received between the road side equipment RSE and the on-board unit OBU.

The road side equipment RSE and the on-board unit OBU repeatedly set a synchronization interval SI until the arrival of the subsequent reference signal, and, upon arrival of the subsequent reference signal, the previous repeating channel interval is stopped and a new synchronization interval is started.

Upon a request from an upper layer for frame transmission, the road side equipment RSE and the on-board unit OBU hold transmission until the arrival of the channel interval for transmitting the corresponding frame, and, when the channel interval for transmitting the corresponding frame arrives, transmit the frame. At this time, the road side equipment RSE and the on-board unit OBU selects a frame to be transmitted by using a contention-based EDCA (Enhanced Distributed Channel Access) scheme.

Figure 4:
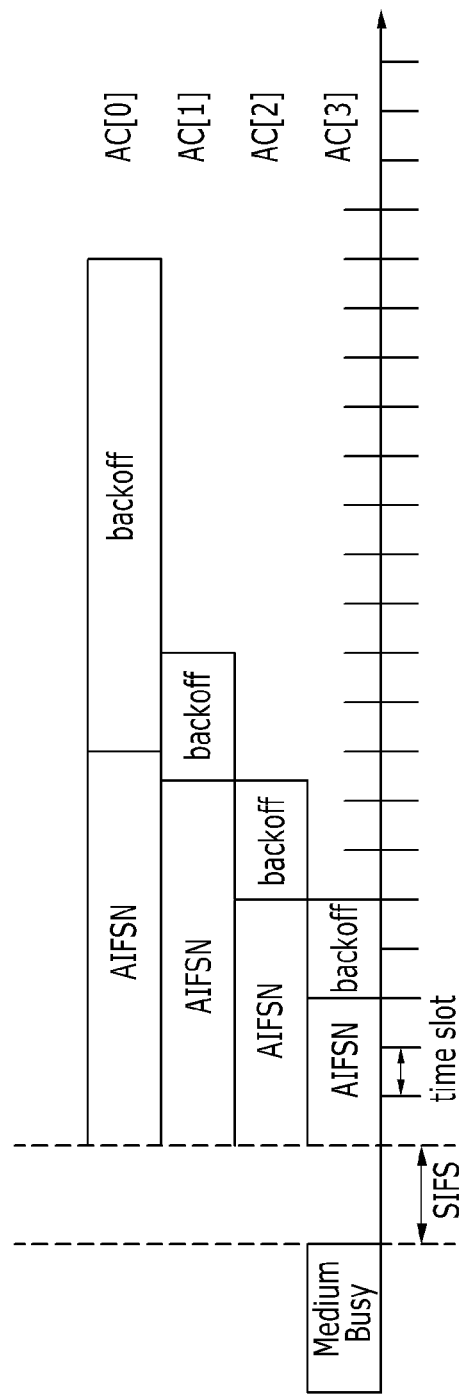
FIG. 4 is a view for explaining a contention-based EDCA scheme applied to the present invention.

FIG. 4 is a view for explaining a contention-based EDCA scheme applied to the present invention.

Referring to FIG. 4, EDCA provides different channel access functions to frames with different priorities given by the upper layer.

EDCA is a scheme that differentiates the channel access probability access by varying the backoff time in such a manner that a frame to be transmitted is divided into four access categories ACs (AC[0], AC[1], AC[2], and AC[3]) and a low contention window (CW) value is given to the AC (AC[3]) with high priority and a high CW value is given to the AC (AC[0]) with low priority.

The ACs (AC[0], AC[1], AC[2], and AC[3]) have their respective transmission queues and AC parameters. The differences in priority between the ACs (AC[0], AC[1], AC[2], AC[3]) are generated from the different AC parameters.

EDCA uses AFIS (Arbitration Inter Frame Space), which is a predetermined waiting time, the minimum contention window value CWmin, and the maximum contention window value CWmax as the AC parameters for the contention to transmit a frame belonging to the ACs (AC[0], AC[1], AC[2], and AC[3]). In an initial transmission attempt, the backoff counter value is set as the minimum contention window value CWmin. At this point, the CW value is increased in case of transmission failure, and the CW value may be increased until it reaches the maximum contention window value CWmax. The backoff counter value is decreased as long as a channel is sensed as being idle.

Basically, the priority increases as the AFIS and the minimum contention window value CWmin decrease, and thus a channel access delay becomes short.

The AIFS is calculated from the AIFSN (Arbitration Inter Frame Space Number) through the following Equation 1:

$$AIFS(AC[i]) = aSIFSTime + AIFSN(AC[i]) * aSlotTime \quad \text{[Equation 1]}$$

where AIFS is an integer greater than 0, and i is an integer greater than 0 and less than 4. aSIFSTime is SIFS (Short Inter Frame Space) time, and is equally assigned to the ACs (AC[0], AC[1], AC[2, and AC[3]). aSlotTime is one slot time. AIFSN is an integer greater than 1. A short AIFSN is assigned to the AC (AC[3]) with high priority, and a long AIFSN is assigned to the AC (AC[0]) with low priority.

A transmission queue of each AC (AC[0], AC[1], AC[2], and AC[3]) detects if a channel is idle for an AIFS time. If the channel is idle for the AIFS time, the CW value and the backoff time are calculated to bring about a contention. The transmission queue that wins the contention gains an opportunity to transmit the frame.

The physical layer determines if a channel is idle and passes channel state information to a MAC layer, and then the transmission queue of each AC (AC[0], AC[1], AC[2], and AC[3]) can detect whether the channel is idle for an AIFS time based on the channel state information passed from the physical layer.

Next, a method of transmitting and receiving a frame based on EDCA performed by road side equipment RSE and an on-board unit OBU will be described in detail with reference to FIGS. 5 to 7.

Figure 5:
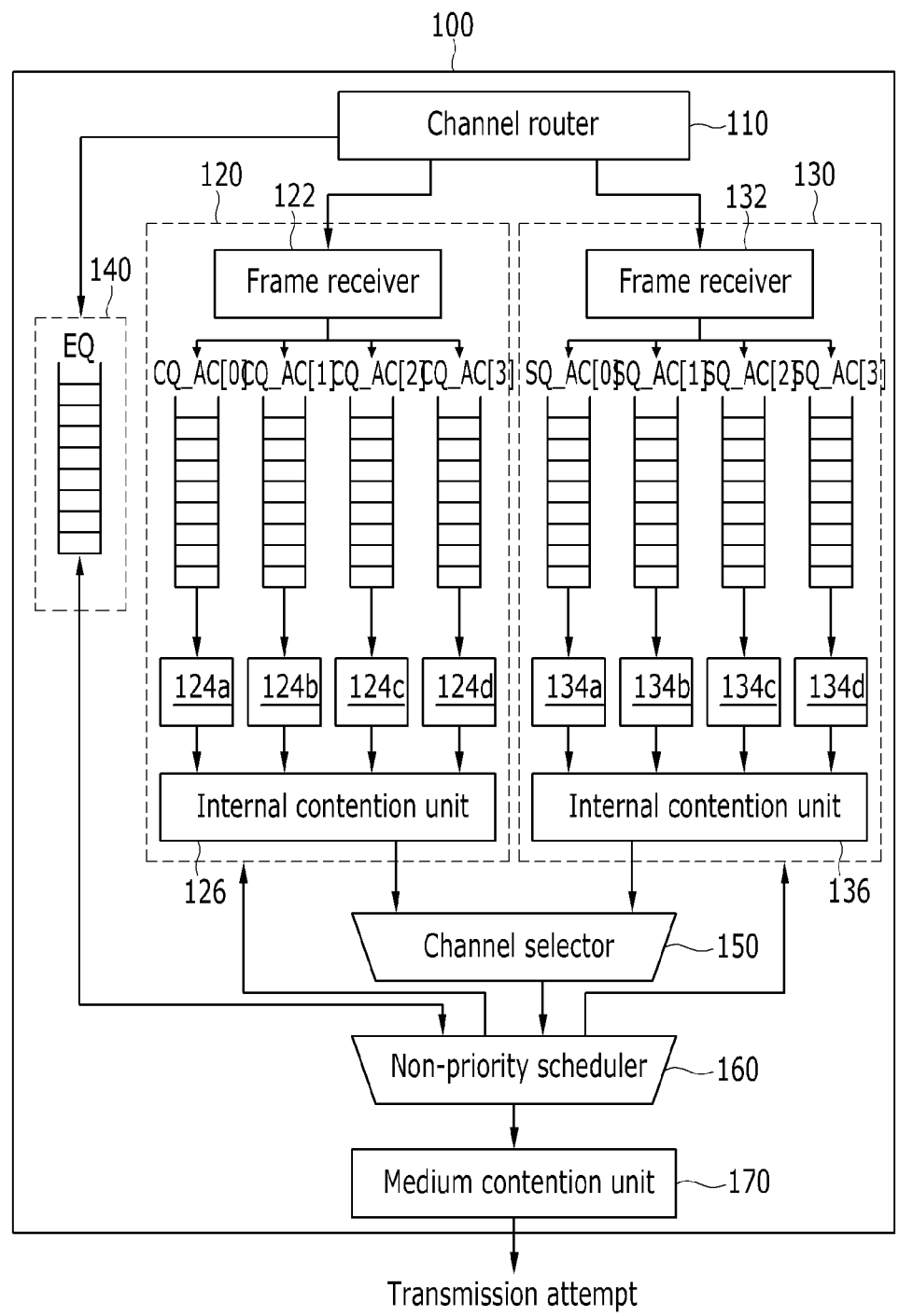
FIG. 5 is a view showing a frame transmitting apparatus according to an exemplary embodiment of the present invention.

FIG. 5 is a view showing a frame transmitting apparatus according to an exemplary embodiment of the present invention.

Referring to FIG. 5, road side equipment RSE and an on-board unit OBU each comprise a frame transmitting apparatus 100.

The operation of the frame transmitting apparatus 100 is performed in a media access control (MAC) layer.

The frame transmitting apparatus 100 comprises a channel router 110, a control channel processor 120, a service channel processor 130, an emergency processor 140, a channel selector 150, a non-priority scheduler 160, and a medium contention unit 170.

Upon receiving a frame from the upper layer, the channel router 110 identifies the type of the frame based on the user priority value contained in the MAC header of the frame and passes the frame to one of the control channel processor 120, the service channel processor 130, and the emergency processor 140.

Each frame arriving at the MAC layer from an upper layer has a specific user priority value, and the user priority value is contained in the MAC header of the frame. Also, the type of a frame can be defined based on the user priority value.

The format of each frame is recorded, and a frame is defined in advance in an upper layer of the MAC layer and passed down to the MAC layer. In the exemplary embodiment of the present invention, a user priority value is contained in the header, and the type of the frame can be identified using this user priority value. Accordingly, if the frame is regarded as a control frame based on the user priority value of the frame, the channel router 110 passes the frame to the control channel processor 120, or if the frame is regarded as an IP frame based on the user priority of the frame, the channel router 110 passes the frame to the service channel processor 130. Moreover, if the frame is regarded as an emergency frame based on the user priority value of the frame, the channel router 110 can pass the frame to the emergency processor 140.

The control channel processor 120 and the service channel processor 130 operate when a channel is idle and select one frame to process and transmit the frame passed from the channel router 110 by an EDCA scheme.

The control channel processor 120 comprises a frame receiver 122, transmission queues (CQ_AC[0], CQ_AC[1], CQ_AC[2], and CQ_AC[3]) corresponding to four ACs, calculators 124a, 124b, 124c, and 124d, and an internal contention unit 126.

The service channel processor 130 comprises a frame receiver 132, transmission queues (SQ_AC[0], SQ_AC[1], SQ_AC[2], and SQ_AC[3]) corresponding to four ACs, calculators 134a, 134b, 134c, and 134d, and an internal contention unit 136.

The frame receivers 122/132 receive a frame from the channel router 110, and store the frame in one of the transmission queues (CQ_AC[0], CQ_AC[1], CQ_AC[2], CQ_AC[3]/SQ_AC[0], SQ_AC[1], SQ_AC[2], SQ_AC[3]) according to the user priority value of the frame.

The transmission queues CQ_AC[0], CQ_AC[1], CQ_AC[2], CQ_AC[3]/SQ_AC[0], SQ_AC[1], SQ_AC[2], SQ_AC[3] respectively correspond to the ACs (AC[0], AC[1], AC[2], and AC[3]) and have different priorities. Also, the transmission queues (CQ_AC[0], CQ_AC[1], CQ_AC[2], CQ_AC[3]/SQ_AC[0], SQ_AC[1], SQ_AC[2], SQ_AC[3]) process frames by First Input First Output (FIFO) method.

As explained above, different AIFS time is set for each AC (AC[0], AC[1], AC[2], and AC[3]), and each AC (AC[0], AC[1], AC[2], and AC[3]) has a different backoff counter value according to the CW value. In an initial transmission attempt, the backoff counter value is set to the minimum contention window value. If the frame loses the contention, the CW value is increased until it reaches the maximum contention window value CWmax. Accordingly, the CW value differs for each AC (AC[0], AC[1], AC[2], and AC[3]) depending on the result of the contention.

The calculators 124a, 124b, 124c, 124d/134a, 134b, 134c, 134d respectively correspond to the ACs (AC[0], AC[1], AC[2], and AC[3]), the AIFS times and CW values of frames output from the corresponding transmission queues (CQ_AC[0], CQ_AC[1], CQ_AC[2], CQ_AC[3]/SQ_AC[0], SQ_AC[1], SQ_AC[2], SQ_AC[3]) are calculated, and the backoff counter value is set corresponding to the CW value.

The internal contention units 126/136 put the frames output from the calculators 124a, 124b, 124c, 124d/134a, 134b, 134c, and 134d into contention based on the backoff counter values if a channel is idle for an AIFS time, and pass a winning frame to the channel selector 150.

The channel selector 150 receives the frames that have won the contention from the control channel processor 120 and the service channel processor, respectively, and passes one of the frames to the non-priority scheduler 160. At this point, if the current channel interval is a control channel interval that uses a control channel, the channel selector 150 may select the frame output from the CCH processor 120 and output it to the non-priority scheduler 160, or if the current channel interval is a service channel interval that uses a service channel, the channel selector 150 may select the frame output from the SCH processor 130 and output it to the non-priority scheduler 160.

Upon receiving the frames simultaneously from the control channel processor 120 and the service channel processor 130, the channel selector 150 may output the frame with a higher user priority value preferentially to the non-priority scheduler 160. The other frame not selected participates in the subsequent contention.

The emergency processor 140 operates when a channel is idle, and processes an emergency frame passed from the channel router 110.

The emergency processor 140 comprises an emergency queue EQ dedicated for an emergency frame. The emergency queue EQ processes an emergency frame in the FIFO method, and passes the emergency frame immediately to the non-priority scheduler 160 without EDCA contention.

That is, a generic frame, such as a control frame or IP frame, other than an emergency frame, acquires a transmission opportunity through EDCA contention and the channel selector 150, whereas an emergency frame is given a transmission opportunity without EDCA contention and hence has a higher channel access probability than a generic frame has and the transmission delay of emergency frames can be greatly reduced.

In the operation of multi-channels consisting of SCHs and a CCH, every base station and vehicle operate based on time synchronized by GPS, and the non-priority scheduler checks a channel interval to control the control channel processor 120, the service channel processor 130, and the emergency processor 140. Then, the control channel processor 120, the service channel processor 130, and the emergency processor 140 outputs frames according to the control of the non-priority scheduler 160.

The non-priority scheduler 160 outputs the frame received from the channel selector 150 to the medium contention unit 170. In the case that the non-priority scheduler 16 simultaneously receives frames from the emergency processor 140 and the channel selector 150, it preferentially outputs the frame received from the emergency processor 140 to the medium contention unit 170.

That is, a generic frame, such as a control frame or IP frame, other than an emergency frame, acquires a transmission opportunity through EDCA contention and the channel selector 150, whereas an emergency frame is given a transmission opportunity without EDCA contention and hence has a higher channel access probability than a generic frame has. Moreover, the transmission delay of emergency frames can be greatly reduced since the non-priority scheduler 160 preferentially processes an emergency frame.

The medium contention unit 170 puts the frame output from the non-priority scheduler 160 into medium contention with other on-board unit, and if the frame wins the contention, attempts a transmission of the frame. At this time, while a generic frame waits for transmission until the corresponding channel interval arrives, an emergency frame can be transmitted regardless of whether the current channel interval is a CCH interval or SCH interval so long as the channel is idle, and thus the transmission delay of the emergency frame can be reduced.

Figure 6:
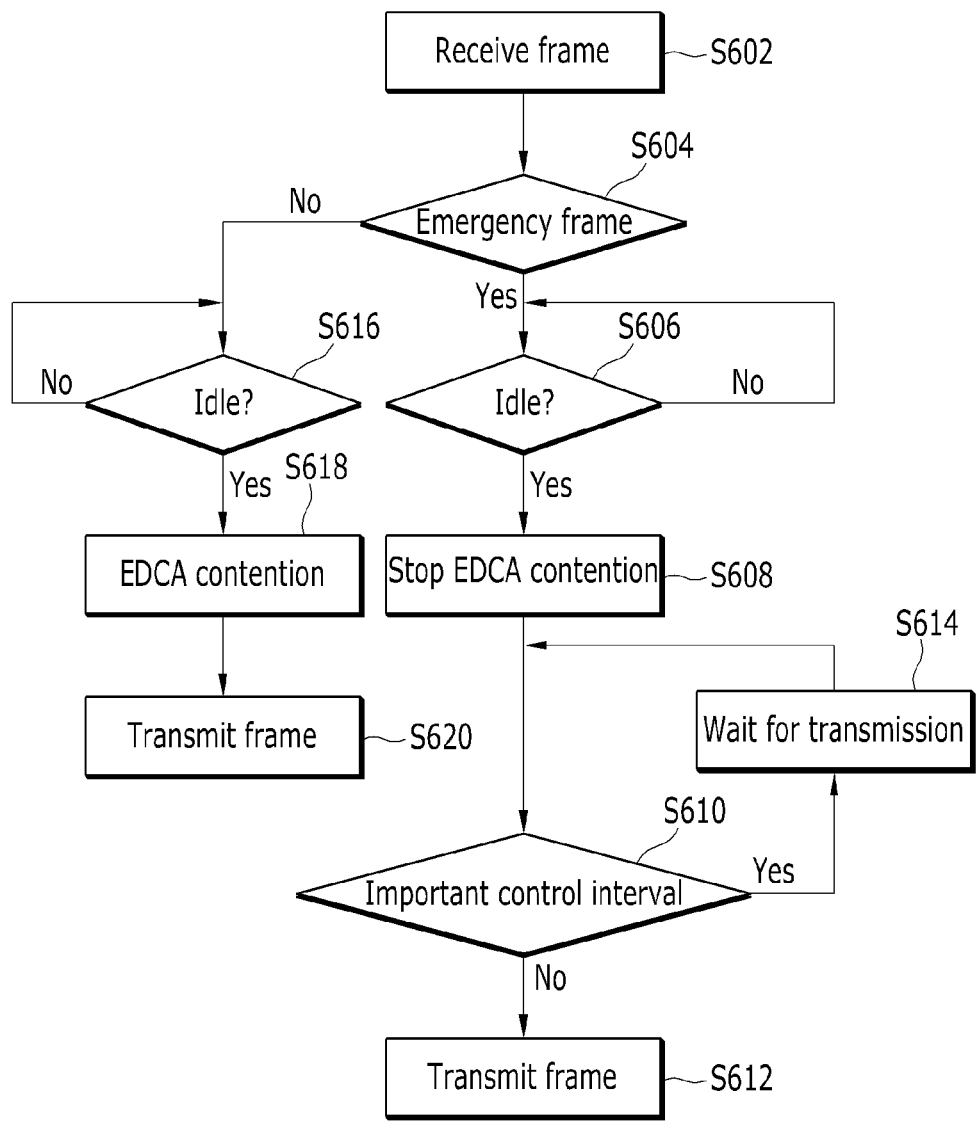
FIG. 6 is a view showing a frame transmission method performed by a frame transmitting apparatus according to an exemplary embodiment of the present invention.

FIG. 6 is a view showing a frame transmission method performed by a frame transmitting apparatus according to an exemplary embodiment of the present invention.

Referring to FIG. 6, if the channel router 110 receives a frame from an upper layer (S602), it identifies whether the corresponding frame is an emergency frame based on a user priority value of the frame (S604).

If the frame received from the upper layer is an emergency frame, the channel router 110 passes the frame to the emergency processor 140.

An emergency queue EQ of the emergency processor 140 checks if a channel is idle (S606). At this point, if the transmission of the emergency frame is made available because the channel is idle, the control channel processor 120 and the service channel processor 130 stop the EDCA contention (S608). A stop mechanism of EDCA contention can be achieved in such a manner that transmission queues (CQ_AC[0], CQ_AC[1], CQ_AC[2], CQ_AC[3]/SQ_AC[0], SQ_AC[1], SQ_AC[2], SQ_AC[3]) of the CCH and SCHs have the initial state of the queue which has lost the EDCA contention. Afterwards, the initiation mechanism of EDCA contention can be realized as specified in the standard.

Meanwhile, a frame cannot be transmitted in a guard interval, and a necessary control situation may occur in a CCH interval. Even when the channel is idle, if the current channel interval is an important control interval, such as a guard interval or a CCH interval during which a necessary control situation occurs, the current channel interval has to be controlled so as not to transmit an emergency frame. Accordingly, when the channel is idle, the emergency queue EQ checks whether the current channel interval is an important control interval according to the control of the non-priority scheduler 160 (S610). When the channel is idle, the emergency queue EQ transmits the corresponding emergency frame through the non-priority scheduler 160 unless the current channel interval is an important control interval (S612), and waits for transmission during an important control interval if the current channel interval is the important control interval (S614).

Meanwhile, if the frame received from the upper layer is a generic frame other than an emergency frame, the channel router 110 passes the generic frame to the control channel processor 120 or the service channel processor 130 using the user priority value of the generic frame.

Each transmission queue (CQ_AC[0], CQ_AC[1], CQ_AC[2], CQ_AC[3]/SQ_AC[0], SQ_AC[1], SQ_AC[2], SQ_AC[3]) of the control channel processor 120 and the service channel processor 130 determines whether a channel is idle (S616). If the channel is idle, each transmission queue (CQ_AC[0], CQ_AC[1], CQ_AC[2], CQ_AC[3]/SQ_AC[0], SQ_AC[1], SQ_AC[2], SQ_AC[3]) participates in EDCA contention, and the transmission queue that has won the contention transmits the corresponding frame (S618-S620).

In summary, frames are continuously received from an upper layer until a channel becomes idle. For example, assuming that received frames sequentially and respectively correspond to the AC[0] of SCH, the AC[2] of SCH, the AC[3] of SCH, the AC[1] of SCH, the AC[3] of CCH, the frames respectively corresponding to the AC[0] of SCH, the AC[2] of SCH, the AC[3] of SCH, the AC[1] of SCH, the AC[3] of CCH are saved in their respective corresponding transmission queues (SQ_AC[0], SQ_AC[2], SQ_AC[3], CQ_AC[1], CQ_AC[3]) because the channels are still busy. Frames are saved in the transmission queues (SQ_AC[0], SQ_AC[2], and SQ_AC[3]) in the SCH interval, the three transmission queues (SQ_AC[0], SQ_AC[2], and SQ_AC[3]) except for the transmission queue (SQ_AC[1]) participate in EDCA contention. Thus, one of the frames of the queue that has won the EDCA contention gains an opportunity of transmission in the SCH interval and the other transmission queues participates again when the next contention opportunity is available. Likewise, frames exist only in the transmission queues (CQ_AC[1] and CQ_AC[3]) in the CCH interval. Thus, only these two transmission queues participate in the contention, and one of the frames of the winning queue gains an opportunity of transmission in the corresponding SCH interval. If frames are saved in all the transmission queues, all of the transmission queues participate in contention.

According to an exemplary embodiment of the present invention, an emergency frame requiring urgent transmission can be quickly transmitted, thus helping drivers to drive safely as well as preventing accidents.

The exemplary embodiments of the present invention are not implemented only by a device and/or method, but can be implemented through a program for realizing functions corresponding to the configuration of the exemplary embodiments of the present invention and a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for transmitting a frame using one physical layer in a vehicle communication system, the apparatus comprising:
    a control channel processor that processes and outputs a generic frame using a control channel;
    a service channel processor that processes and outputs a generic frame using a service channel;
    an emergency processor that processes and outputs an emergency frame;
    a channel router that identifies the type of a frame received from an upper layer, and passes the received frame to one of the control channel processor, the service channel processor, and the emergency processor;
    a channel output unit that selects and outputs one of the frames output from the control channel processor and the service channel processor; and
    a non-priority scheduler that selects either the emergency frame output from the emergency processor or the generic frame output from the channel output unit, and gives a transmission opportunity to the selected frame,
    wherein the non-priority scheduler gives the transmission opportunity preferentially to the emergency frame,
    wherein the control channel processor and the service channel processor each divide the generic frame into a plurality of access categories with different priorities, and processes the generic frame for each access category in a contention-based EDCA (Enhanced Distributed Channel Access) scheme and outputs the frame to the channel output unit.

2. The apparatus of claim 1, wherein the control channel processor and the service channel processor each comprise:
    a plurality of transmission queues respectively corresponding to a plurality of access categories with different priorities, and storing generic frames of the corresponding access categories therein;
    a plurality of calculators respectively corresponding to the plurality of transmission queues, and calculating access category parameters of the generic frames output from the plurality of transmission queues; and
    an internal contention unit for outputting one of the generic frames to the channel output unit using the access category parameters of the generic frames of the respective transmission queues.

3. The apparatus of claim 1, wherein the channel router identifies the type of the received frame based on a user priority value of the received frame.

4. The apparatus of claim 1, wherein the control channel processor and the service channel processor operate in the respective channel intervals.

5. The apparatus of claim 1, wherein the control channel processor, the service channel processor, and the emergency processor each operate when a channel is idle.

6. The apparatus of claim 5, further comprising: a medium contention unit for transmitting the frame that has acquired the transmission opportunity.

7. The apparatus of claim 6, wherein, when a channel is idle, the medium contention unit waits for transmission of the emergency frame if the current channel interval is an important control interval, and transmits the emergency frame if the current channel interval is an interval other than the important control interval, and
    the important control interval comprises a guard interval between a control channel interval for operating a control channel and a service channel interval for operating a service channel.

8. The apparatus of claim 7, wherein, the medium contention unit transmits a generic frame using a control channel if the current channel interval is the control channel interval, and transmits a generic frame using a service channel if the current channel interval is the service channel interval.

9. A method for transmitting a frame using one physical layer in a vehicle communication system, the method comprising:
    receiving a frame from an upper layer;
    identifying the type of the frame;
    checking the state of a channel; and,
    when the channel is idle, transmitting an emergency frame requiring urgent transmission preferentially over a generic frame,
    wherein the transmitting comprises:
        giving a transmission opportunity to the generic frame through EDCA (Enhanced Distributed Channel Access) contention;
        giving the transmission opportunity to the emergency frame without the EDCA contention;
        determining whether the current channel interval is an important control interval or not; and
        transmitting the emergency frame in a channel interval which the current channel interval is not the important control interval,
        wherein the important control interval comprises a guard interval positioned between a control channel interval for operating a control channel and a service channel interval for operating a service channel.

10. The method of claim 9, wherein the transmitting further comprises:
    transmitting a generic frame using the control channel only in the control channel interval; and
    transmitting a generic frame using the service channel in the service channel interval.

11. The method of claim 9, wherein the giving of the transmission opportunity to the generic frame comprises:
    classifying the generic frame and storing in one of a plurality of transmission queues with priorities; and
    selecting one of the generic frames stored in the plurality of transmission queues through internal contention.

12. The method of claim 11, wherein the plurality of transmission queues comprise:
    a plurality of first transmission queues with different priorities used for a control channel; and a plurality of second transmission queues with different priorities used for a service channel.

13. A method for transmitting a frame using one physical layer in a vehicle communication system, the method comprising:
receiving a frame from an upper layer;
if the frame is an emergency frame to be urgently transmitted, storing the frame in a first transmission queue;
if the frame is a generic frame, storing the frame in one of a plurality of second transmission queues used for a control channel and a plurality of third transmission queues used for a service channel;
allowing at least one of the plurality of second transmission queues and the plurality of third transmission queues to participate in internal contention in each channel interval;
giving priority of transmission opportunity to the emergency frame output from the first transmission queue over the generic frame of the transmission queue that has won the internal contention;
giving the transmission opportunity:
transmitting the emergency frame in a channel interval except a guard interval; and
transmitting the generic frame of the transmission queue that has won the internal contention in a channel interval, corresponding to a channel in use, except the guard interval.

14. The method of claim 13, wherein the selecting comprises stopping the internal contention during the transmission of the emergency frame.

15. The method of claim 11, wherein the participating comprises:
allowing at least one of the plurality of second transmission queues to participate in internal contention for a control channel interval; and
allowing at least one of the plurality of third transmission queues to participate in internal contention for a service channel interval.

* * * * *